United States Patent [19]

Ueda

[11] 4,212,676

[45] Jul. 15, 1980

[54] COMPOSITIONS FOR SOLID WRITING MATERIALS AND WRITING IMPLEMENTS

[75] Inventor: Ken Ueda, Shijonawate, Japan

[73] Assignee: Sakura Color Products Corporation, Japan

[21] Appl. No.: 11,935

[22] Filed: Feb. 13, 1979

[30] Foreign Application Priority Data

Feb. 22, 1978 [JP] Japan .................................. 53-20284

[51] Int. Cl.² ............................................. C09D 13/00
[52] U.S. Cl. ..................................... 106/19; 106/271; 106/272
[58] Field of Search ......................... 106/19, 271, 272

[56] References Cited

U.S. PATENT DOCUMENTS

| | | | |
|---|---|---|---|
| 3,249,448 | 5/1966 | Coburn et al. | 106/31 |
| 3,767,444 | 10/1973 | Zeisberger | 106/308 R |
| 3,957,495 | 5/1976 | Teranishi et al. | 106/19 |

FOREIGN PATENT DOCUMENTS

2613933 10/1977 Fed. Rep. of Germany.

*Primary Examiner*—Earl A. Nielsen
*Attorney, Agent, or Firm*—McGlew and Tuttle

[57] ABSTRACT

This invention relates to solid writing materials capable of giving writings, drawings or markings which are readily erasable with a dry eraser such as a blackboard eraser, dry fabric, etc.

This invention provides compositions for such solid writing materials comprising (i) an emulsifiable polyethylene wax, (ii) a liquid organic compound substantially incompatible with the component (i) and having a specified boiling point and viscosity, (iii) an organic solvent capable of dissolving or uniformly dispersing the components (i) and (ii) and having a specified boiling point and (iv) a pigment.

19 Claims, No Drawings

COMPOSITIONS FOR SOLID WRITING MATERIALS AND WRITING IMPLEMENTS

This invention relates to compositions for solid writing material of the novel type for writing and drawing on enameled metal panels, glass panels, plastics panels, metal panels and like smooth-surfaced writing panels, such that the writings and drawings produced on the panel are readily erasable with a dry eraser such as a blackboard eraser, dry fabric, paper or the like. This invention also relates to writing implements comprising such a solid writing material.

So-called "marking ink" in the form of a liquid has been introduced into wide use in place of chalks as a writing material for producing erasable writings, drawings and markings on writing panels. The marking ink heretofore known, however, is prone to degradation due to the evaporation of the solvent and to the resulting change in its composition. The evaporation of the solvent makes the ink progressively viscous and causes the solid components to deposit, eventually clogging up the nib of the writing implement which utilizes a capillary action and rendering the implement difficult to use or unusable in a relatively short period of time. Moreover the writings or drawings produced are not completely erasable and tend to leave traces of stain on the surface. In view of these drawbacks, it has been strongly desired to provide a solid writing material for use on writing panels. Crayons have long been used as solid drawing materials. Although highly adherent to the surface of paper, crayons have poor adhesion to panels of plastics, metal, ceramics or like smooth-surfaced panels. When made rough-surfaced, these panels could be useful for crayons, but the drawings produced thereon would not be easily erasable. An attempt has been made to improve crayons and provide solid writing materials which have the property of giving writings, drawings or markings which are readily erasable (hereinafter referred to as "erasability") as well as the property of being smoothly and uniformly applicable to various smooth-surfaced writing panels (hereinafter referred to as "writability"). However, the solid writing materials thus provided still remain to be improved in their writability and erasability. Furthermore such solid writing materials are not satisfactory in that the ingredients used are expensive and must be melted at a high temperature for the production of the writing composition.

Accordingly an object of this invention is to provide a solid writing material of the novel type useful for writing, drawing and marking and having outstanding writability on enameled metal panels, glass panels, plastics panels, usual metal panels, ceramics panels or like panels for writing and drawing purposes.

Another object of this invention is to provide a solid writing material of the novel type having high erasability when used on writing panels of enameled metal, glass, plastics, metal, ceramics, etc.

Another object of this invention is to provide a novel solid writing material which retains its quality with high stability in spite of the lapse of time so as to be usable for a prolonged period of time.

Still another object of this invention is to provide a novel solid writing material which is producible advantageously with savings in energy and with use of relatively inexpensive ingredients.

Other objects and features of this invention will become apparent from the following description.

This invention provides compositions for writing materials which comprise (i) about 25 to about 50% by weight of at least one emulsifiable polyetheylene wax having a penetration value according to JIS K 2530 of about 1 to about 20 and an acid value of about 10 to about 25, (ii) about 12 to about 25% by weight of at least one liquid organic compound having a boiling point of not lower than 190° C. and a viscosity of about 10 to about 2000 cps at 20° C. and selected from the group consisting of (a) higher aliphatic monohydric alcohols, (b) saturated aliphatic dihydric alcohols, (c) polyalkyleneoxides and (d) glycerine and glycerine derivatives, (iii) about 20 to about 45% by weight of at least one organic solvent capable of dissolving or uniformly dispersing the components (i) and (ii) and having a boiling point higher than about 90° C. but lower than 190° C. and selected from the group consisting of (a) ethers of glycols, (b) ether esters of glycols, (c) aliphatic monohydric alcohols, (d) cyclic monohydric alcohols and (e) a mixture containing 50 to 99% by weight of at least one of the solvents (a), (b), (c) and (d) and 1 to 50% by weight of non-polar organic solvents, and (iv) about 2 to about 30% by weight of at least one pigment.

To overcome the foregoing problems encountered in the prior art, I have conducted extensive research and found the following. The above-mentioned composition is useful for producing a solid writing material which has good writability on enameled metal, glass, plastics, usual metal, ceramics or like panels for writing and drawing purposes. The solid writing material applied to such panels is easily erasable with a dry eraser such as a blackboard eraser, dry fabric, paper, etc. Unlike the marking inks, the solid writing materials according to this invention are preservable for a greatly prolonged period of time substantially free of changes in their quality insofar as they are put up in a simple case. Furthermore even if the surface of the writing material should dry to some extent, the dry surface will suppress the evaporation of the solvents from the interior, thereby preventing degradation, and will be easily removable by the writing pressure to produce a fresh exposed surface, permitting the solid writing material to restore good writability and erasability. The solid writing material according to this invention is economically advantageously producible since the ingredients used are relatively low in cost and can be uniformly mixed together at a relatively low temperature. This invention has been accomplished based on these novel findings.

Although research has yet to be made to fully clarify why these remarkable results are achievable, the outstanding results appear to be attributable to the conjoint use of the components (i), (ii) and (iii). Whereas the component (i), namely emulsifiable polyethylene wax, itself has an adhesive property, the conjoint use of the component (i) and the components (ii) and (iii) imparts good erasability as well as the excellent properties mentioned above to the resulting solid writing material. The desired solid writing material is difficult to obtain by the use of substances other than the component (i). For example, polyethylene, which is generally used as one of the ingredients of crayon, when substituted for the component (i), will not dissolve or disperse in the component (iii), namely the specific organic solvent, failing to give the desired solid writing material.

In addition, the solid writing material according to this invention, when applied to a writing panel, dries within a short time. Accordingly color transfer does not occur when the finger or clothes touch the writing on the panel, and the writing will not spread on rubbing.

The component (i), i.e. emulsifiable polyethylene wax, is a polyethylene wax comprising carboxyl groups in the molecule and having a low molecular weight, and prepared preferably by the oxidation of polyethylene. According to this invention, a wide variety of emulsifiable polyethylene waxes may be used. Typical of such waxes are oxidized polyethylene waxes having a penetration value according to JIS K 2530 of more than about 1 but up to about 20, preferably up to about 10, more preferably up to about 6, and having an acid value of more than about 10 but up to about 25, preferably up to about 15. The emulsifiable polyethylene wax may preferably have a weight-average molecular weight of about 1,000 to about 10,000, although the molecular weight is not limited to the above range. The use of emulsifiable polyethylene wax having a penetration value greatly exceeding 20 will tend to impart insufficient hardness to the resulting writing material, whereas the use of emulsifiable polyethylene wax having a penetration value of lower than 1 is likely to give exceedingly high hardness to the resulting writing material. In either case, the resulting writing material will have poor writability. Emulsifiable polyethylene waxes having an acid value of lower than 10 will generally be difficult to mix with other components, whereas those having an acid value of higher than 25 will tend to impart a reduced erasability to the resulting writing material. Examples of useful emulsifiable polyethylene waxes are those commercially available under the trademarks of "AC polyethylene #629", "AC polyethylene #655", "AC polyethylene #680" and "AC polyethylene #690" (products of Allied Chemical Corporation, U.S.A.), "MITSUI Hi-wax 4053, E", "MITSUI Hi-wax 4202 E" and "MITSUI Hi-wax 2102 E" (products of Mitsui Petrochemical Co., Ltd., JAPAN), etc. These emulsifiable polyethylene waxes are used singly or in admixture. According to this invention, the component (i) is used in an amount of about 25 to about 50% by weight, preferably about 35 to about 45% by weight, of the composition. With more than about 50% by weight of the wax used, the resulting writing material tends to become too hard and to have reduced writability, necessitating higher writing pressure than usual to produce uniform writings, so that the writings will strongly adhere to the panel and reduced erasability will often result. With less than about 25% by weight of the wax used, the resulting writing material will have insufficient hardness and, when applied to a panel, give thick writings with reduced erasability.

The component (ii) of this invention is serviceable mainly as a releasing agent for imparting erasability to the present compositions. The component (ii), i.e. liquid organic compound, is substantially incompatible with the component (i) and has a boiling point of not lower than 190° C. and a viscosity of about 10 to about 2000 cps at 20° C. Examples of compounds useful as the component (ii) in this invention are (a) higher aliphatic monohydric alcohols, (b) saturated aliphatic dihydric alcohols, (c) polyalkyleneoxides and (d) glycerine and glycerine derivatives, the compounds (a), (b), (c) and (d) having a boiling point and viscosity mentioned as above. Examples of higher aliphatic monohydric alcohol (a) are n-decyl alcohol, 4,6,8-trimethyl-nonyl alcohol, 3,5,5-trimethyl-hexyl alcohol, 3,9-diethyl-6-tridecyl alcohol, oleyl alcohol, 11-octyl-dodecyl alcohol, etc. Examples of saturated aliphatic dihydric alcohols (b) are ethylene glycol, 1,3-propanediol, 1,3-butanediol, 1,5-pentanediol, 2-methyl-2,4-pentanediol, 2-ethyl-1,3-hexanediol, etc. Examples of polyalkyleneoxides (c) are polyethylene glycol having an average molecular weight of about 100 to about 400, polypropylene glycol having an average molecular weight of about 130 to about 3000, etc. Examples of glycerine derivatives (d) are glyceryl triacetate, glyceryl diacetate, glyceryl monobutyrate, diglycerine, etc. The compounds (a), (b), (c) and (d) are not limited to the examples given. Other compounds may be usable insofar as they are substantially incompatible with the component (i) and have a boiling point of not lower than 190° C. and a viscosity of about 10 to about 2000 cps at 20° C. Compounds compatible with the component (i) will impart low hardness, adhesive property and therefore reduced erasability to the resulting writing material. If compounds having a boiling point of lower than 190° C. are used, the writings or drawings produced by the use of the resulting writing material will lose its erasability when left to stand for a long time since such compounds as above will tend to easily evaporate from the writings or drawings. The use of compounds having a viscosity of above about 2000 cps at 20° C. will render the resulting writing material adherent and impart reduced erasability to the material, especially at low temperatures. According to this invention, the component (ii) is used in an amount of about 12 to about 25% by weight, preferably about 15 to about 22% by weight, of the composition. With more than 25% by weight of the component (ii) used, the resulting material will have reduced writability and the writings or drawings produced thereby will be adherent and will not be readily erasable, leaving traces of stain on the panel. With less than 12% by weight of the component (ii) used, an insufficient releasing effect and therefore low erasability will result.

Organic solvents useful as the component (iii) in this invention are those capable of dissolving or uniformly dispersing the components (i) and (ii) and having a boiling point higher than about 90° C. but lower than 190° C. The organic solvents preferably have a boiling point of about 120° to about 170° C. Organic solvents having a boiling point below about 90° C. will rapidly evaporate from the resulting material, causing degradation in a short time, give reduced writability to the writing material and entail the problem of causing ignition, evaporation losses, etc. during the production. Conversely organic solvents having a boiling point of not lower than 190° C. will not readily evaporate from the writings or drawings produced by the resulting writing material, so that the writings or drawings will not be readily erasable, especially shortly after writing. Useful organic solvents as the component (iii) are (a) ethers of glycols, (b) ether esters of glycols, (c) saturated aliphatic monohydric alcohols, (d) cyclic monohydric alcohols and (e) a mixture containing 50 to 99% by weight of at least one of the solvents (a), (b), (c) and (d), and 1 to 50% by weight of a non-polar organic solvent having a boiling point of higher than about 90° C. but lower than 190° C. Examples of ethers of glycols (a) are ethylene glycol monomethyl ether, ethylene glycol monobutyl ether, propylene glycol monoethyl ether, etc. Examples of ether esters of glycols (b) are ethylene glycol monoethyl ether acetate, 3-methoxybutyl acetate, etc. Examples of lower saturated aliphatic monohydric alcohols (c) are n-propyl alcohol, n-, sec- and iso-butyl alcohols, n-, sec-, iso- and tert-amyl alcohols, 1,3-dimethyl-butyl alcohol, 2-ethyl-butyl alcohol, 2-heptyl alcohol, 3-heptyl alcohol, etc. Examples of cyclic alcohols (d) are cyclohexyl alcohol, α-methyl-cyclohexyl alcohol, α-ethyl-cyclohexyl alcohol, furfuryl alcohol, tetrahydro-furfuryl alcohol, glycidol, etc. Examples of the non-polar solvents for composing the mixture (e) are hydrocarbons, alkyl-substituted cyclohexane, alkyl-substituted benzene, etc. Typical of the hydrocarbons are n-heptane, n-octane, iso-octane, n-decane, etc. Typical of the alkyl-substituted cyclohexane are methyl-cyclohexane, ethyl-cyclohexane, n-butyl-cyclohexane, etc. Typical of the alkyl-substituted benzene are toluene, o-, m- and p-xylenes, ethyl-benzene, o-, m- and p- diethyl-benzenes, iso-propyl-benzene, etc. These organic solvents (a) to (d) are used, singly or in admixture, in an amount of about 20 to about 45% by weight, preferably about 25 to about 40% by weight, of the composition. The use of more than about 45% by weight of the solvent will give low strength to the resulting writing material, whereas the use of less than about 20% by weight of the solvent will be likely to impart exceedingly high hardness and reduced erasability to the resulting writing material.

Pigments useful as the component (iv) in this invention are those conventionally known and used for crayons. Examples of useful pigments are titanium dioxide, zinc oxide, cadmium sulfide, Carmine 6B, Lake Red C, chrome yellow, Hanza Yellow (e.g. C.I.11680, C.I.11730, C.I.11710, C.I.11660, C.I.11670, etc.), chrome green, Cyanine Green, Cyanine Blue, ultramarine blue, red iron oxide, carbon black, etc. Also usable are black iron oxide, cobalt blue, barium yellow, yellow iron oxide and Benzidine Orange (e.g. C.I.21110, etc.) and like pigments. Usually these pigments are used in an amount of about 2 to 30% by weight of the composition, although the amount may vary depending on the color desired. If less than about 2% by weight of the pigments are used, the desired coloring effect will be difficult to achieve, whereas use of more than about 30% by weight of the pigments is unlikely to produce a noticeably improved effect. The pigments are used preferably in an amount of about 4 to about 25% by weight of the composition.

The composition of this invention may incorporate known fillers as desired in addition to the essential ingredients described. Examples of useful fillers are calcium carbonate, magnesium carbonate, silica, alumina, talc, lithopone, kaoline, clay, calcium stearate, etc.

Furthermore the composition of this invention may incorporate known liquid additives used for crayons and oil pastels for imparting an improved coloring effect and writability to the resulting writing material. These additives are also serviceable for giving an improved writability to the resulting material such that the material is smoothly applicable even when the surface thereof dries due to the evaporation of the solvent. Typical of the additives are liquid paraffines, esters of phthalic acid, esters of dicarboxylic acid, liquid higher fatty acids, alkyl esters and glyceryl esters of higher fatty acids, etc. Examples of the liquid paraffins are liquid paraffins (boiling point: at least 300° C.; specific gravity $d_{20}^{20}$: 0.860–0.890; viscosity: at least 37 centistokes (37.8° C.)) and light liquid paraffins (boiling point: at least 300° C.; specific gravity $d_{20}^{20}$: 0.830–0.870; viscosity: less than 37 centistokes (37.8° C.)) as prescribed in Japanese Pharmacopoeia, 9th Revision. Also usable are chlorinated paraffins, liquid polybutenes, etc. Examples of esters of phthalic acid are diethyl phthalate, dibutyl phthalate, dioctyl phthalate, etc. Examples of esters of dicarboxylic acids are diethyl sebacate, etc. Examples of liquid higher fatty acids are caprylic acid, oleic acid, etc. Examples of alkyl esters of higher fatty acids are ethyl stearate, butyl stearate, butyl palmitate, hexyl myristate, octyl laurate, octyl oleate, etc. Examples of glyceryl esters of higher fatty acids are vegetable oils such as coconut oil, tsubaki oil, etc. The amount of these additives to be used varies with the properties, especially penetration value of the emulsifiable polyethylene wax used. For example, these additives are used in a greater amount when the emulsifiable polyethylene wax having lower penetration value is used. Conversely they are used in a lesser amount when the wax having higher penetration value is used. Preferably the additives are used in an amount of up to about 8% by weight of the composition, since the use of the additives in an amount exceeding about 8% by weight will tend to impart greatly reduced erasability to the resulting writing material.

For illustrative purposes, a process for preparing the compositions of this invention will be described below. The order stated in which the components are added is not limitative but may be changed as desired. First, the component (i), together with the additives if desired, is melted at a temperature of about 110° to about 120° C. To the resulting melt is added the component (iv), together with the filler if desired, and the resulting mixture is fully kneaded. To the mixture thus kneaded and maintained at a temperature of about 100° to about 120° C. is added the component (iii) heated at a temperature of about 70° to about 100° C., and the mixture thus obtained is stirred. To the resulting mixture is added the component (ii), and the mixture is stirred at a high speed to obtain a uniform dispersion, thereby giving a composition of this invention.

The composition of this invention in a liquid state is then placed into a mold with a cavity of specified shape, e.g. circular or square in cross section, and solidified by cooling, thereby giving a writing material of this invention.

The writing implements of this invention are made by the following method. The composition is shaped in an appropriate form with use of a mold as above, and placed into a suitable air-impermeable case. Alternatively, the composition in a liquid state is directly poured into a suitable air-impermeable case, and solidified by cooling. The writing material thus obtained will be exposed at its front end when put to use. Examples of useful cases are those of a capped case of the extensible type similar to those used for putting up rouges, stick form paste or the like and those comprising a tube of air-impermeable material, such as aluminum foil, resin film, aluminum foil-resin film composite sheet or paper impregnated with resin, and a cap or lid attached to each end of the tube.

The writing implement is used on enameled metal panels, ceramics panels, plastics panels, glass panels, paperboard panels impregnated with resin and like writing panels or boards with application of slight pressure in the same manner as chalks. By virtue of the pressing contact of the writing implement with the writing surface, the writing material easily adheres to the surface, producing uniform and thick writings or drawings thereon. Since the coating thus obtained dries within a short time after writing, the dry coating does not permit any color transfer and is readily erasable with a usual blackboard eraser, or dry fabric, paper or the like, leaving no stain on the writing panel. The solid writing materials according to this invention are preservable for a greatly prolonged period of time substantially free of any changes in composition and in quality insofar as they are put up in cases. Should the front end surface of the writing material dry to some extent with the cap of the case left open, the dry portion will be removable to expose a wet surface for smooth writing by applying to the front end a slightly greater writing pressure than the usual.

The features of this invention will become more apparent from the examples given below, in which the parts and percentages are all by weight.

EXAMPLE 1

A 30-part quantity of emulsifiable polyethylene wax (trade mark: "AC polyethylene #629", product of Allied Chemical Corporation, U.S.A., penetration value: 5.5, acid value: 15), 6 parts of carbon black and 4 parts of chlorinated paraffin (trade mark: "Enpara K-65", product of Ajinomoto Co., Inc., JAPAN) are kneaded in a three-roll mixer to obtain pellets. The pellets (36 parts) are placed and melted at 110° C. in a Henschel type mixer (trade mark "Super Mixer-SMV-20", product of Kawata Seisakusho Co., Ltd., JAPAN). Then 15 parts of cyclohexyl alcohol heated at 80° C. is added to the molten mixture with stirring at 400 RPM, and the resulting mixture is maintained at 80° to 100° C. with stirring at the same speed. Then the stirring speed is raised to about 1400 RPM. Subsequently a mixture of 6 parts of 2-methyl-2,4-pentanediol and 6 parts of glycerine and being heated at 90° C. is slowly added to the mixture over a period of 5 to 10 minutes. The resulting mixture is stirred at the same speed for at least 5 minutes. The composition thus obtained is poured into a tubular mold and solidified by cooling, thus giving a solid writing material of this invention.

The writing material is smoothly and uniformly applicable on enameled metal panels, plastics panels, ceramics panels, glass panels and like writing panels. The coating obtained dries about 20 seconds after writing and does not permit color transfer. The coating is readily and completely erasable by rubbing once or twice with a usual blackboard eraser without leaving any trace of stain.

A piece of the solid writing material is placed in a capped case of the extensible type having an interior space, 12 mm in inside diameter and 100 mm in length, then allowed to stand for 6 months with the cap closed and thereafter put to use. The test piece is usable free of any degradation.

Another piece of the solid writing material, similarly encased, is allowed to stand indoors for 5 days with the cap removed and thereafter used. The test piece requires a slightly greater writing pressure in the beginning for the removal of the dry surface but restores good writability immediately thereafter, showing no degradation.

EXAMPLE 2

A composition is prepared according to this invention in the same manner as in Example 1 except that the following ingredients are used.

| Ingredients | % |
| --- | --- |
| Emulsifiable polyethylene wax (trade mark "AC polyethylene # 680", product of Allied Chemical Corporation, penetration value: 1.5, acid value: 16) | 28 |
| n-Butyl stearate | 4 |
| Glyceryl diacetate | 8 |
| Polypropylene glycol (average molecular weight: 600) | 8 |
| Titanium dioxide | 20 |
| Cyanine Blue | 6 |
| Ethylene glycol isopropyl ether | 26 |

A solid writing material is prepared by pouring the composition obtained as above into a case of the extensible type having an inside diameter of 12 mm and a length of 100 mm, and subjecting the composition to solidification by cooling.

The material is fully comparable to the material of Example 1 in respect of writability, erasability and stability against degradation.

EXAMPLE 3

A composition is prepared according to this invention in the same manner as in Example 1 except that the following ingredients are used.

| Ingredients | % |
| --- | --- |
| Emulsifiable polyethylene wax (trade mark "MITSUI Hi-wax 4053 E", product of Mitsui Petrochemical Co., Ltd., JAPAN, penetration value: 2, acid value: 20) | 38 |
| Liquid paraffin (viscosity: 1,000 cps at 20° C.) | 6 |
| 4,6,8-Trimethyl-nonyl alcohol | 10 |
| Polyethylene glycol (average molecular weight: about 300) | 6 |
| Titanium dioxide | 18 |
| 3-Methoxy-butyl acetate | 22 |

A solid writing material is prepared from the above composition in the same manner as in Example 2.

The material is substantially equivalent to that of Example 1 in properties.

EXAMPLE 4

A composition is prepared according to this invention in the same manner as in Example 1 except that the following ingredients are used.

| Ingredients | % |
| --- | --- |
| Emulsifiable polyethylene wax (trade mark: "MITSUI Hi-wax 2102 E", product of Mitsui Petrochemical Co., Ltd., JAPAN, penetration value: 4, acid value: 15) | 35 |
| Oleic acid | 3 |
| Diglycerine | 12 |
| Ethylene glycol | 10 |
| Titanium dioxide | 10 |
| Lake Red C | 5 |
| N-Hexyl alcohol | 25 |

A solid writing material is prepared from the above composition in the same manner as in Example 2.

The material is substantially equivalent to that of Example 1 in properties.

EXAMPLE 5

A composition is prepared according to this invention in the same manner as in Example 1 except that the following ingredients are used.

| Ingredients | % |
|---|---|
| Emulsifiable polyethylene wax (trade mark: "MITSUI Hi-wax 2102 E") | 35 |
| Polyethylene glycol (average molecular weight: about 400) | 16 |
| 3-Methoxy-butyl acetate | 31 |
| Titanium dioxide | 10 |
| Carmine 6B | 5 |
| Chlorinated paraffin (trademark: "Enpara K-65") | 3 |

A solid writing material is prepared from the above composition in the same manner as in Example 2.
The material is found to be comparable to that of Example 1 in properties.

EXAMPLE 6

A composition is prepared according to this invention in the same manner as in Example 1 except that the following ingredients are used.

| Ingredients | % |
|---|---|
| Emulsifiable polyethylene wax (trade mark: "MITSUI Hi-wax 4053 E") | 35 |
| 3,5,5-Trimethyl-hexyl alcohol | 15 |
| α-Methyl-cyclohexyl alcohol | 29 |
| Titanium dioxide | 10 |
| Cyanine Green | 5 |
| Dioctyl phthalate | 6 |

A solid writing material is prepared from the above composition in the same manner as in Example 2. The material is found comparable to that of Example 1 in properties.

EXAMPLE 7

A composition is prepared according to this invention in the same manner as in Example 1 except that the following ingredients are used.

| Ingredients | % |
|---|---|
| Emulsifiable polyethylene wax (trade mark: "AC polyethylene # 680") | 35 |
| Glyceryl monobutyrate | 20 |
| Cyclohexyl alcohol | 20 |
| Methyl-cyclohexane | 12 |
| Carbon black | 8 |
| Oleic acid | 5 |

A solid writing material is prepared from the above composition in the same manner as in Example 2. The material is found comparable to that of Example 1 in properties.

EXAMPLES 8 AND 9

Two kinds of compositions are prepared according to this invention in the same manner as in Example 1 except that the following ingredients are used, respectively.

| Ingredients | Ex. 8 | Ex. 9 |
|---|---|---|
| Emulsifiable polyethylene wax (trade mark: "AC polyethylene # 629") | 25 | 38 |
| Mixture of diglycerine (12 parts), polyethylene glycol (8 parts) having an average molecular weight of about 300 and 2-methyl-2,4-pentanediol (3 parts) | 20 | 17 |
| Mixture of cyclohexyl alcohol (2 parts) and ethyl-cyclohexane (1 part) | 39 | 29 |
| Red iron oxide | 16 | 16 |

Two kinds of solid writing materials are prepared respectively from the compositions in the same manner as in Example 2.

The materials obtained in Examples 8 and 9 are smoothly and uniformly applicable to glass panels, enameled metal panels, metal panels, plastics panels and like writing panels. At 22° C. and at 60% RH, the coating produced by the material of Example 8 on an enameled metal panel dries about 16 seconds after writing. Under the same condition the coating produced by the writing material of Example 9 dries about 20 seconds after writing. Either of the coatings does not permit color transfer and is readily erasable by lightly rubbing 3 to 5 times with a usual blackboard eraser. The coatings are readily erasable by rubbing only once or twice, if rubbed strongly.

Either of the materials is left to stand indoors for 1 hour with the cap removed and thereafter put to use. The materials are found substantially free of degradation in writability.

Also the materials are allowed to stand indoors for 3 days with the cap removed and thereafter put to use. The materials require a slightly greater writing pressure in the beginning for the removal of the dry surface but restore good writability immediately thereafter, showing no degradation.

I claim:
1. A composition for a writing material comprising:
  (i) about 25 to 50% by weight of at least one emulsifiable polyethylene wax having a penetration value according to JIS K 2530 of about 1 to about 20 and an acid value of about 10 to about 25,
  (ii) about 12 to about 25% by weight of at least one liquid organic compound having a boiling point of not lower than 190° C. and a viscosity of about 10 to about 2000 cps at 20° C. and selected from the group consisting of (a) higher aliphatic monohydric alcohols, (b) saturated aliphatic dihydric alcohols, (c) polyalkyleneoxides and (d) glycerine and glycerine derivatives,
  (iii) about 20 to about 45% by weight of at least one organic solvent capable of dissolving or uniformly dispersing the components (i) and (ii) and having a boiling point higher than about 90° C. but lower than 190° C. and selected from the group consisting of (a) ethers of glycols, (b) ether esters of glycols, (c) aliphatic monohydric alcohols, (d) cyclic monohydric alcohols and (e) a mixture containing 50 to 99% by weight of at least one of the solvents (a), (b), (c) and (d) and 1 to 50% by weight of nonpolar organic solvents, and
  (iv) about 2 to about 30% by weight of at least one pigment.
2. A composition as defined in claim 1 wherein the component (i) has a penetration value of about 1 to about 10.

3. A composition as defined in claim 1 wherein the component (i) has a penetration value of about 1 to about 6.

4. A composition as defined in claim 1 wherein the component (i) has an acid value of about 10 to about 15.

5. A composition as defined in claim 1 wherein the component (i) is used in an amount of about 35 to about 45% by weight of the composition.

6. A composition as defined in claim 1 wherein the component (ii) is at least one of higher aliphatic monohydric alcohols having a boiling point of not lower than 190° C. and a viscosity of about 10 to about 2000 cps at 20° C.

7. A composition as defined in claim 1 wherein the component (ii) is at least one of saturated aliphatic dihydric alcohols having a boiling point of not lower than 190° C. and a viscosity of about 10 to about 2000 cps at 20° C.

8. A composition as defined in claim 1 wherein the component (ii) is at least one of polyalkyleneoxides having a boiling point of not lower than 190° C. and a viscosity of about 10 to about 2000 cps at 20° C.

9. A composition as defined in claim 1 wherein the component (ii) is at least one of glycerine and glycerine derivatives having a boiling point of not lower than 190° C. and a viscosity of about 10 to about 2000 cps at 20° C.

10. A composition as defined in claim 1 wherein the component (ii) is used in an amount of about 15 to about 22% by weight of the composition.

11. A composition as defined in claim 1 wherein the component (iii) is at least one of ethers of glycols capable of dissolving or uniformly dispersing the components (i) and (ii) and having a boiling point higher than about 90° C. but lower than 190° C.

12. A composition as defined in claim 1 wherein the component (iii) is at least one of ether esters of glycols capable of dissolving or uniformly dispersing the components (i) and (ii) and having a boiling point higher than about 90° C. but lower than 190° C.

13. A composition as defined in claim 1 wherein the component (iii) is at least one of saturated aliphatic monohydric alcohols capable of dissolving or uniformly dispersing the components (i) and (ii) and having a boiling point higher than about 90° C. but lower than 190° C.

14. A composition as defined in claim 1 wherein the component (iii) is at least one of cyclic monohydric alcohols capable of dissolving or uniformly dispersing the components (i) and (ii) and having a boiling point of higher than about 90° C. but lower than 190° C.

15. A composition as defined in claim 1 wherein the component (iii) is a mixture of 50 to 99% by weight of at least one of the solvents (a), (b), (c) and (d) and 1 to 50% by weight of at least one of non-polar organic solvents, the mixture being capable of dissolving or dispersing the components (i) and (ii) and the non-polar organic solvents having a boiling point higher than about 90° C. but lower than 190° C.

16. A composition as defined in claim 1 wherein the component (iii) has a boiling point of about 120° to about 170° C.

17. A composition as defined in claim 1 wherein the component (iii) is used in an amount of about 25 to about 40% by weight of the composition.

18. A composition as defined in claim 1 wherein the component (iv) is used in an amount of about 4 to about 25% by weight of the composition.

19. A writing implement comprising a solid shaped material and an air-impermeable case accomodating the solid shaped material therein, the solid shaped material being prepared from a composition comprising:
(i) about 25 to about 50% by weight of at least one emulsifiable polyethylene wax having a penetration value according to JIS K 2530 of about 1 to about 20 and an acid value of about 10 to about 25,
(ii) about 12 to about 25% by weight of at least one liquid organic compound having a boiling point of not lower than 190° C. and a viscosity of about 10 to about 2000 cps at 20° C. and selected from the group consisting of (a) higher aliphatic monohydric alcohols, (b) saturated aliphatic dihydric alcohols, (c) polyalkyleneoxides and (d) glycerine and glycerine derivatives,
(iii) about 20 to about 45% by weight of at least one organic solvent capable of dissolving or uniformly dispersing the components (i) and (ii) and having a boiling point higher than about 90° C. but lower than 190° C. and selected from the group consisting of (a) ethers of glycols, (b) ether esters of glycols, (c) aliphatic monohydric alcohols, (d) cyclic monohydric alcohols and (e) a mixture containing 50 to 99% by weight of at least one of the solvents (a), (b), (c) and (d) and 1 to 50% by weight of non-polar organic solvents, and
(iv) about 2 to about 30% by weight of at least one pigment.

* * * * *